J. W. VAUGHN.
RECORDER OR REGISTER.
APPLICATION FILED JUNE 3, 1912.

1,055,577.

Patented Mar. 11, 1913.
7 SHEETS—SHEET 5.

Witnesses
J. N. Lyles
C. L. Schmidt

Inventor
John W. Vaughn

By Shepherd Campbell
Attorneys

J. W. VAUGHN.
RECORDER OR REGISTER.
APPLICATION FILED JUNE 3, 1912.

1,055,577.

Patented Mar. 11, 1913.
7 SHEETS—SHEET 7.

Inventor
John W. Vaughn

Witnesses

By Shepherd & Campbell
Attorneys

UNITED STATES PATENT OFFICE.

JOHN W. VAUGHN, OF NOROTON HEIGHTS, CONNECTICUT.

RECORDER OR REGISTER.

1,055,577.   Specification of Letters Patent.   Patented Mar. 11, 1913.

Application filed June 3, 1912. Serial No. 701,199.

*To all whom it may concern:*

Be it known that I, JOHN W. VAUGHN, a citizen of the United States of America, residing at Noroton Heights, in the county of Fairfield and State of Connecticut, have invented certain new and useful Improvements in Recorders or Registers, of which the following is a specification.

This invention relates to a recorder or register and the object of the invention is to provide an improved device of this character constructed in such a manner as to record the time of a service performed, by whom performed, to record the nature of the coin used in payment, to record the total amount involved in the various transactions, and to record the number of coins or checks that have been passed through the machine irrespective of their denominations.

In carrying out the invention, a clock mechanism is provided, this clock mechanism actuating a pair of steel tapes, one of which is termed the minutes tape and the other of which is termed the hours tape. The hours tape bears numbers from one to twelve in raised characters, and the minutes tape bears numbers from one to sixty, likewise in raised characters, the hours and minutes tapes passing between a yielding backing block and a printing plunger. These characters may be repeated as many times as may be desired. There is provided in conjunction with said printing plunger, a coin and check receptacle located to one side of the line of travel of the hours and minutes tape. A total adder steel tape and a count tape are also arranged to travel between the printing plunger and the backing block, and between the total adder and coin tapes and the hours and minutes tapes travels a paper tape or web of such width as to be printed upon by all of said tapes, and also by the checks and coins when the printing plunger is actuated. It will therefore be seen that when the printing plunger is actuated, the hours and minutes tape will imprint upon the paper tape the time of such actuation. The check, which is an identifying check, will imprint upon the paper tape, an identifying mark to indicate by whom a service was performed, the imprint of the coin upon the paper tape showing the amount paid for such service. The count tape will imprint upon the paper tape, the total number of checks and coins paid out, and the total adder tape will print upon the paper tape the total amount involved in all of the transactions. All of these operations are brought about by the actuation of a single handle, and means are provided for rendering the actuation of this handle certain, to compel actuation of the handle throughout its full travel, to prevent movement of the handle when there is no check or coin in the machine, to impart a step by step movement to the paper web and to prevent the overwinding of the clock mechanism.

Further objects and advantages of the invention will be set forth in the detailed description which now follows.

In the accompanying drawings

Like numerals designate corresponding parts in all of the figures of the drawings.

Referring to the drawings, the numeral 5 designates a casing having mounted therein a clock movement indicated at 6. The dial 7 of the clock is visible at the exterior of the casing. The clock movement is of the usual and well known construction. A detailed description thereof is thought to be unnecessary. Much of the clock mechanism has been omitted from the drawings.

Figure 1:
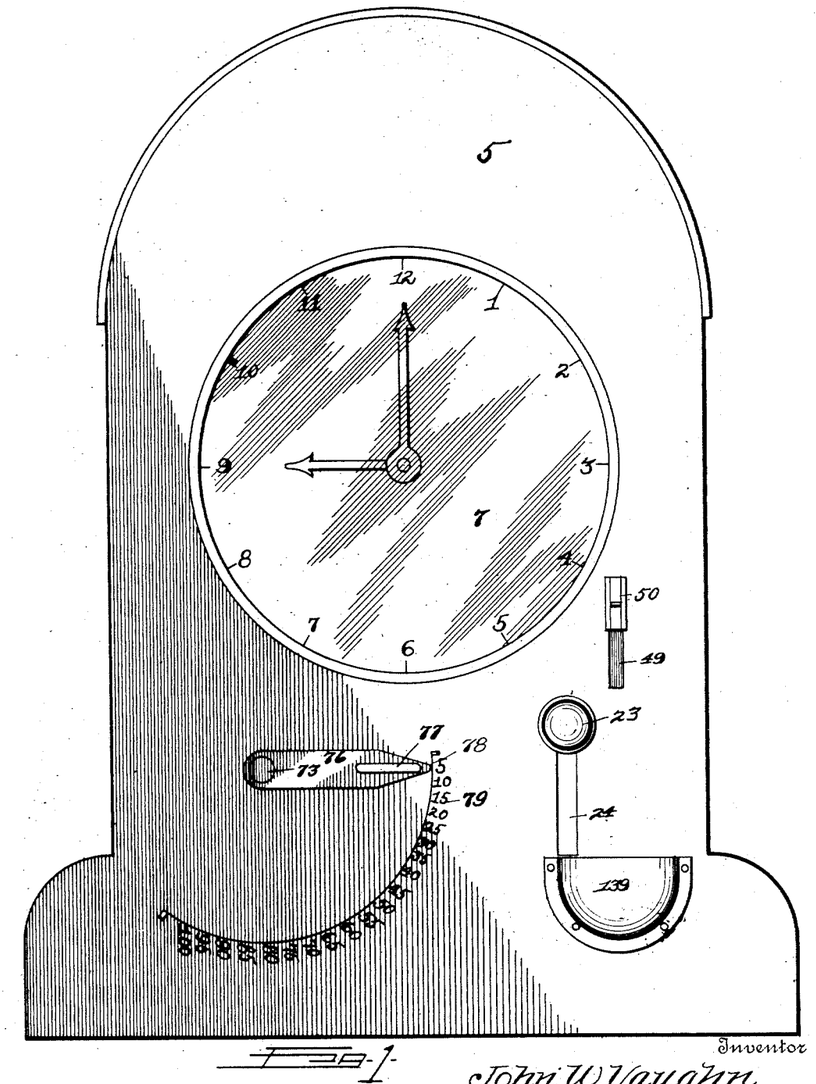
Figure 1 is a front elevation of a device constructed in accordance with the invention.
Figure 2:
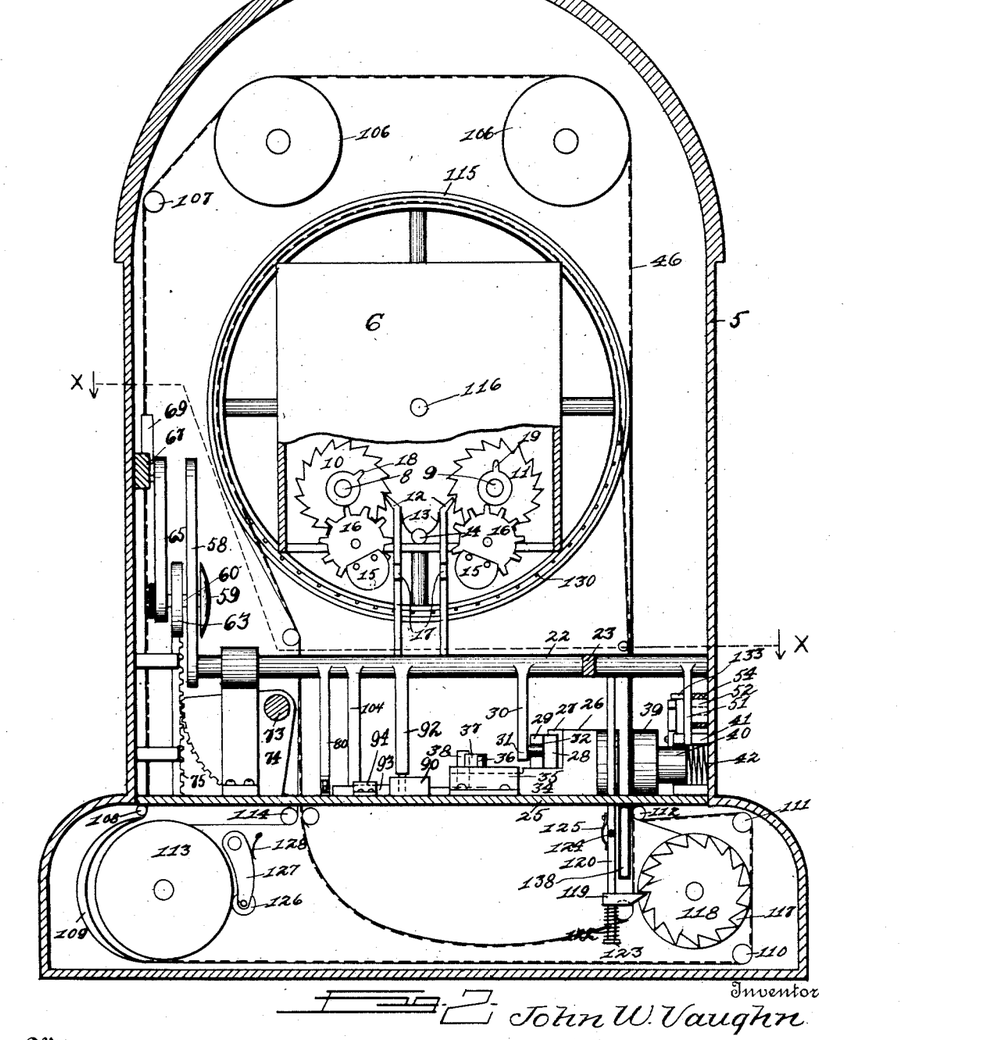
Fig. 2 is a like view with the front of the casing removed, and with certain of the parts omitted.
Figure 3:
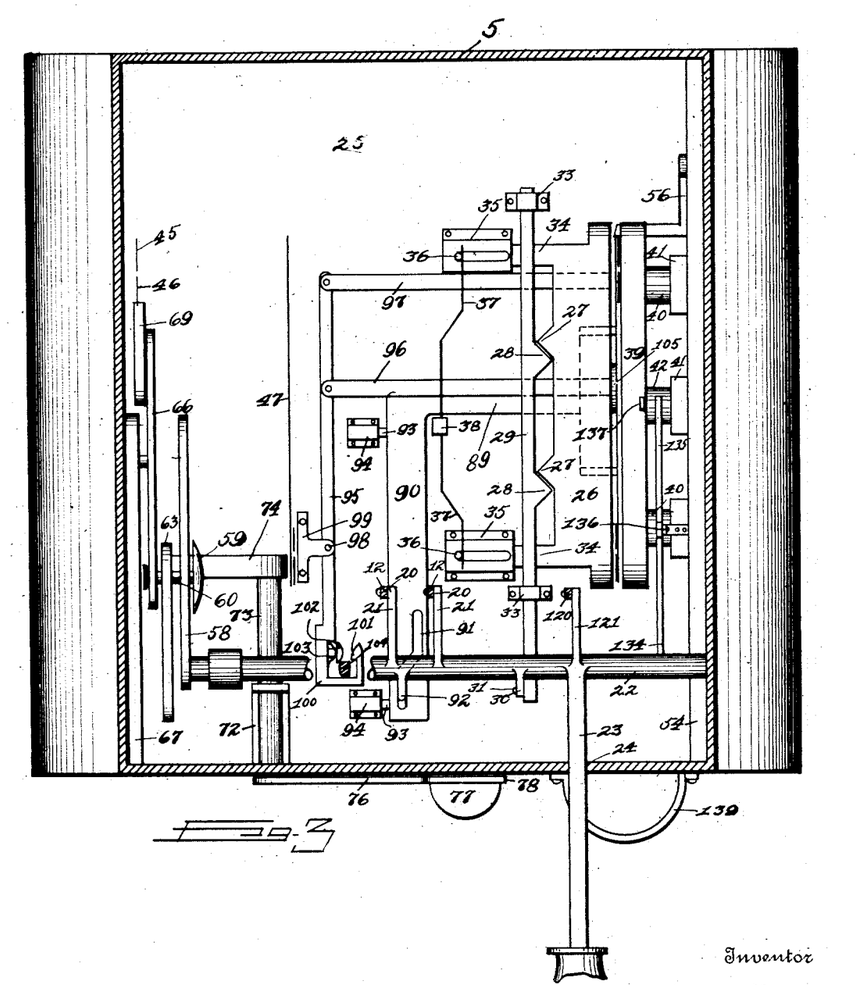
Fig. 3 is a horizontal section upon line X—X of Fig. 2.

Referring to Fig. 2, 8 and 9 designate time and strike winding arbors which wind the springs, (not shown) of the time and strike mechanism of the clock movement. Upon these arbors ratchet wheels 10 and 11 are mounted and these ratchet wheels are adapted to have movement imparted thereto by pawls 12. Flat springs 13, carried by a stud 14, bear against the rear faces of pawls 12 and press them into engagement with the ratchets 10 and 11, to permit movement of the pawls out of engagement with these ratchets when cams 15 carried by toothed wheels 16 contact with transverse extensions 17 with the pawls. Movement is imparted to the toothed wheels 16 by teeth 18 and 19. Since it is desired to have the clock mechanism wound by the actuation of the main handle, it is necessary to provide means for preventing overwinding of the clock mechanism, and the structure above described serves this desirable function. That is, after the clock has been wound to a predetermined degree, the slow step by step movement imparted to wheels 16 by the engagement of teeth 18 and 19 therewith, causes the cams 15 to push the pawls out of engagement with the ratchets 10 and 11, and consequently actuation of the pawls at this time will not move the ratchet wheels or the winding arbors 8 and 9. The pawls 12 are pivotally connected at 20 to rearwardly extending arms 21, of a main transverse shaft 22. A main manually operable handle 23 projects from this shaft forwardly through a slot 24 formed in the front wall of the casing. Extending transversely across the casing 5 is a floor or partition 25 which supports a printing plunger 26. This printing plunger is best illustrated in Fig. 3 and has cam extensions 27 formed upon its rear face adapted to be engaged by similar extensions 28 carried by a bar 29. Longitudinal movement is imparted to this bar by means of an arm 30 which extends downwardly from shaft 22 and has a pin 31 engaging in a slot 32 of said bar. Bar 29 is mounted in keepers 33. The printing plunger 26 has rearwardly extending arms 34 which are slidably disposed in housings 35 and which carry upwardly projecting pins 36. The free ends of spring 37 bear upon the pins 36 and the central bowed portion of this spring is secured to a stud 38. This spring serves to normally hold the printing plunger in a retracted position. Opposed to the printing plunger is a backing block 39 having plungers 40 extending from its rear face which enter housings 41 and bear therein against springs 42, said springs normally tending to force said backing block inwardly. Passing downwardly between the printing plunger and the backing block are a number of tapes, viz., an hours tape 43, a minutes tape 44, a count tape 45, and a total adder tape 46. A paper web 47 of such amplitude as to overlap all of these tapes likewise passes downwardly between the printing plunger and the backing block. The paper web tape lies outside of the hours and minutes tapes, while it lies inside of the total adder and count tapes. A double coin chute comprising an upper portion 48 and a lower portion 49 is adapted to have the entrance to either of said portions obstructed by a slide 50, so that a coin or check may only be placed in one of said portions at a time. These chutes conduct the coins or checks to the space between the printing plunger and the backing block, and the reason for providing a two part chute will be hereinafter set forth.

Figure 4:
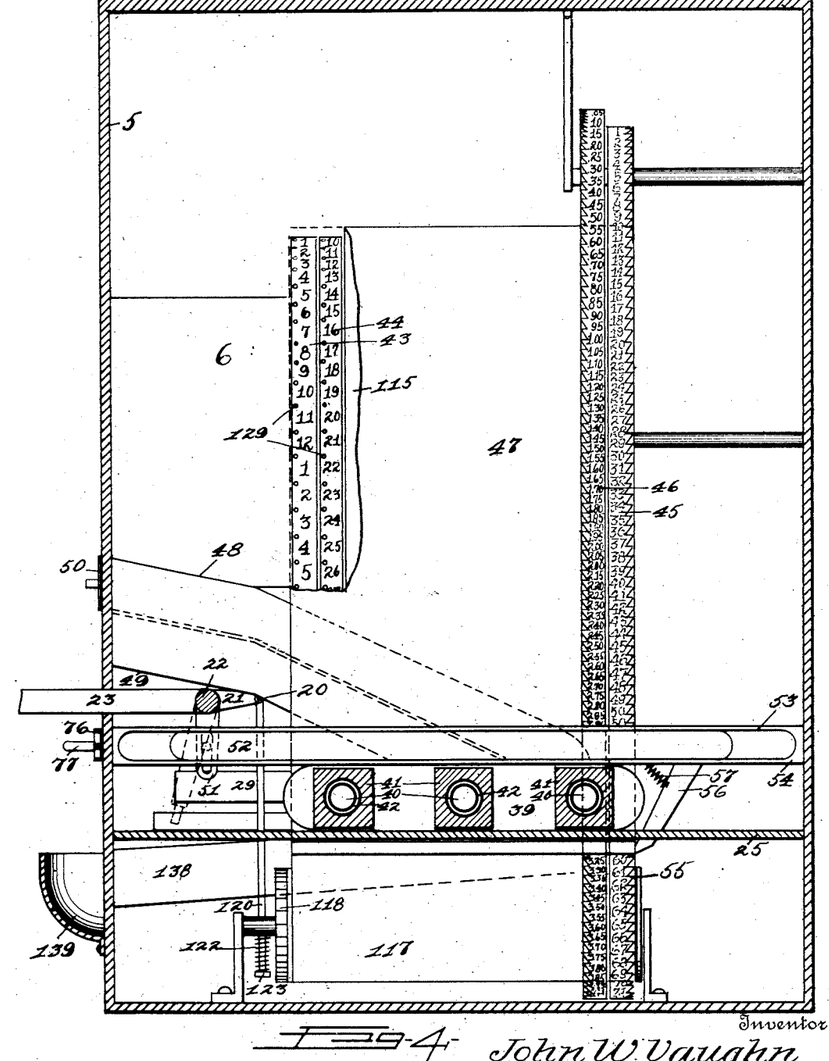
Fig. 4 is a view with one side of the casing removed.

The means for actuating the count tape 45 comprises a crank arm 51 upon shaft 22. This crank arm has a pin and slot connection with a slide 52, said slide being disposed for longitudinal movement in a guideway 53 formed in a bar 54 secured to the inner face of the right hand wall of the casing. The count tape is provided with ratchet teeth 55 along one of its edges, adapted to be engaged by a pawl 56. A spring 57 is connected to this pawl and to the slide 52. When the main handle 23 is pressed downwardly, the slide is forced to the right in Fig. 4, and the spring 57 tends to move the pawl 56 into longitudinal alinement with slide 52. This causes it to engage another of the teeth 55 so that when the handle 23 rises again and the slide is drawn toward the left in Fig. 4, the return of the pawl to the position illustrated in Fig. 4 will cause the count tape to be moved.

Figure 5:
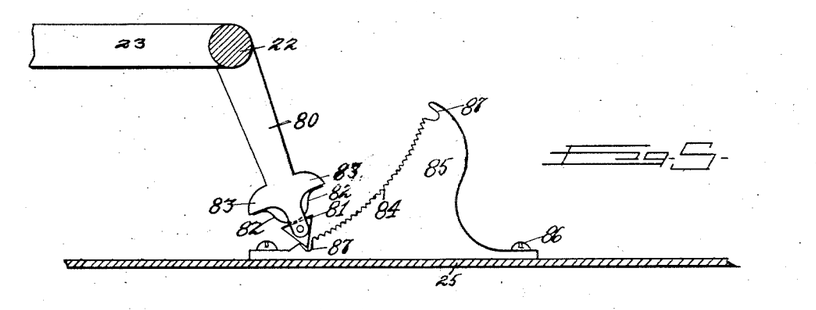
Fig. 5 is a detailed view of the mechanism for preventing movement of the main actuating handle, except when the handle is actuated its full travel.
Figures 6, 7:
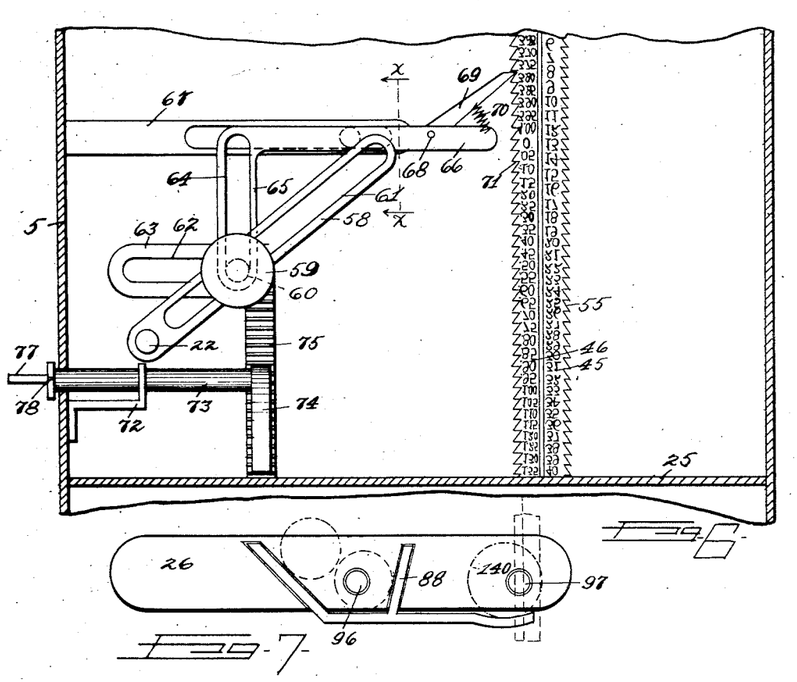
Fig. 6 is a detailed view illustrating a variably shiftable mechanism for actuating the total adder tape.
Fig. 7 is a front elevation of the printing plunger and the coin and check receptacle.
Figures 8, 9, 11, 12, 13:
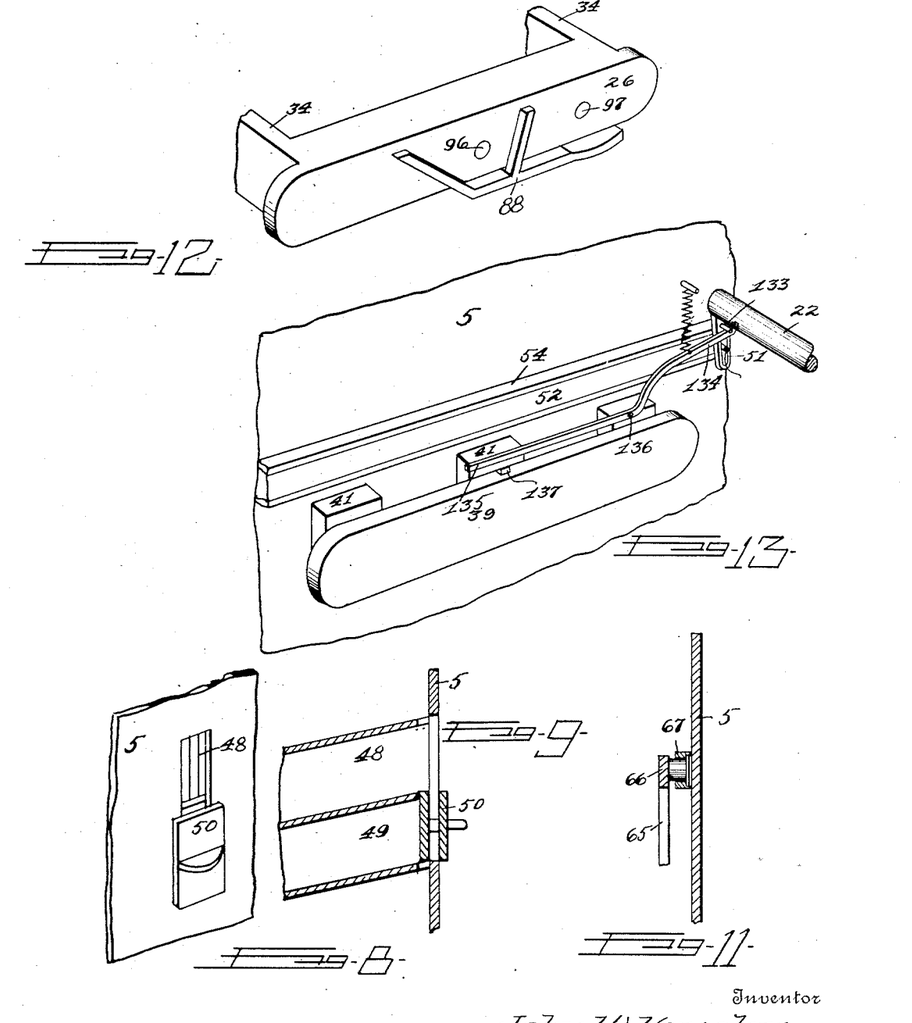
Fig. 8 is a detailed perspective view of a slide controlling the entrance to the coin chutes.
Fig. 9 is a sectional view through said slide, and the mouth portions of the chutes.
Fig. 11 is a detail sectional view upon line X—X of Fig. 6.
Fig. 12 is a detail perspective view of a portion of the printing plunger.
Fig. 13 is a detail perspective view of the backing block and the latch therefor.

The count tape has numbers arranged consecutively from one to any desired number, and moves one number at a time and serves to print upon the paper web, the total number of times the machine has been operated, and consequently the total number of transactions. The total adder tape 46 is adapted to have a variable movement imparted thereto, and this tape has raised figures thereon, and also the raised characters CHK., the latter indicating "check". The figures on this total adder tape run 5, 10, 15, 20, 25, etc., as high as desired. The structure for imparting the necessary variable movement to the total adder tape 46 is best illustrated in Fig. 6. By referring to this figure it will be seen that the shaft 22 carries an inclined slotted arm 58. A headed button 59 has a shank 60 which passes through a slot 61 formed in arm 58, through the slot 62 of a cross head 63, and a slot 64 of an angular extension 65, of a longitudinally movable bar 66, said longitudinally movable bar having a sliding mounting in a cross bar 67 carried by the left side wall of the casing 5. Pivoted at 68 to this bar is a pawl 69, and a spring 70 extends between the pawl and the free end of the bar. The pawl engages teeth 71 formed upon the edge of the total adder tape 46. Journaled in the front wall of the casing 5 and in a bracket 72 is a shaft 73. At its inner end this shaft carries a segment 74 meshing with teeth 75 upon a downward extension of cross head 62. Outside of the front wall of the casing this shaft 73 is mounted upon a handle 76 that is provided with a finger piece 77. This handle terminates in a pointer 78 that travels over a scale 79. When the handle is moved, say from zero to fifteen, the segment 74 elevates the cross head 62 through the medium of the teeth 75, and causes a shifting of pin 60 in the slot of arm 58, this movement very evidently determining the degree of throw to be imparted to the longitudinally movable bar 66. When the handle 23 is moved downwardly and shaft 22 is turned, it is apparent that a longitudinal shifting will be imparted to bar 66 away from teeth 71, and this permits the pawl 69 to move into engagement with that tooth necessary to bring the proper number before the printing block to record the total amount of the transactions upon return movement of shaft 22. It is apparent that it would be fatal to the proper operation of this machine to have the handle 23 only partially actuated. I have, therefore, provided means requiring the operator to impart a full movement to the handle in both directions after movement of the handle has once started. This structure is best illustrated in Fig. 5, and by referring to said figure it will be seen that an arm 80 is mounted upon shaft 22, and at the free end of this arm is pivoted a substantially triangular dog 81. Springs 82 bear between this dog, and extensions 83 of arm 80, and serve to hold said dog in proper alinement. The free end of the dog travels over teeth 84 of a segment 85, which is rigidly fixed at 86 to the partition 25. At opposite ends of the teeth 84, deep notches 87 are formed, and it is apparent that after the handle has once started to move, triangular dog 81 will be held at such an angle that the movement of the handle cannot be reversed until movement of the handle has been completed and the dog enters one of the notches 87, at which time the dog may pass over the center to permit reversal of the movement of the handle.

It is to be understood that the coins and checks do not remain in the machine, but pass through the machine. To prevent them from falling straight through after they have been placed in the coin chutes, a coin and check receptacle 88 (see Figs. 3 and 7) is provided. This receptacle moves in cut out portions of the printing plunger 26, and it is provided with a rearwardly extending stem 89 which terminates in a lateral extension 90, having a cam slot 91 formed therein. A downwardly extending arm 92 of shaft 22 engages in this cam slot, and serves to retract the coin receptacle 88. The extension 90 carries pins 93 which travel in housings 94 and serve as guides for the coin and check receptacle. It is desirable to prevent actuation of the handle 23 when there is no coin or check in printing position, and to accomplish this I provide a lever 95 having plungers 96 and 97 and pivoted thereto, said plungers passing through the printing plunger 26. The lever 95 is pivoted at 98 to a bracket 99, and carries an L-shaped head 100. This L-shaped head terminates in a hook extension 101. A plunger 102 has a spring 103 bearing thereagainst. An arm 104 on shaft 22, extends downwardly and lies in the position illustrated in Fig. 3. It is apparent that when the handle 23 is depressed, the shaft 22 turns, and the arm 104 moves outwardly between plunger 102 and hook 101 in Fig. 3. If a coin, such as is indicated at 105 in Fig. 3, is in position, the plunger 96 will be prevented by said coin from free movement toward the right and at this time the plunger 102 will merely be forced toward the left against the tension of spring 103 and the arm 104 will pass between the plunger and the hook 101, but if there be no coin in position, the tension of spring 103 will be sufficient to cause the L-shaped end 100 of lever 95 to move bodily toward the left instead of forcing the plunger 102 in against the tension of this spring, and when this occurs, the hook extension 101 engages the arm 104 and prevents movement of handle 23. The plunger 97 acts in exactly the same manner with relation to the check placed in the upper coin chute 48, as will be hereinafter set forth. The count and adder tapes, which, as hereinbefore set forth, lie outside of the paper web, pass over guide wheels 106 (see Fig. 2) over guide rolls 107 and 108, around curved guides 109, and around guide rolls 110, 111 and 112. The mechanism for imparting motion to these tapes has already been described. The paper web passes from a roll 113, over a guide roll 114, over a paper web wheel 115, which is concentric with the main arbor 116 of the clock mechanism and is wound upon a roll 117 to which motion is imparted by a ratchet wheel 118. This ratchet wheel is engaged by a dog 119 carried by a rod 120, depending from an arm 121 of shaft 22. A spring 122 bears between the underside of the dog and a head 123, so that the movement imparted to the roll 117 is not a sudden one, but upon the contrary is a gradual one. To permit the proper action of dog 119, the rod 120 is jointed at 124, and the two parts of the rod are normally held in alinement with each other by a spring 125. To keep the desired tension upon the paper web, a roller 126, carried by a pivoted arm 127 is forced by spring 128 into engagement with the paper wound upon roll 113. The hours tape wheel, and consequently the hours tape, is driven from the striking mechanism of the clock so that it is moved with a step by step movement, being shifted once each hour. The minutes tape wheel is driven by the time movement of the clock and is continuously in motion, but the printing plunger and backing block are of such width as to insure the printing of one of the minutes designations at each actuation of the printing plunger. The hours and minutes tapes have openings 129 formed adjacent their edges, which engage with pins 130 formed upon the hours and minutes tape wheels, whereby a positive movement is insured to these tapes.

Figures 10, 14, 15:
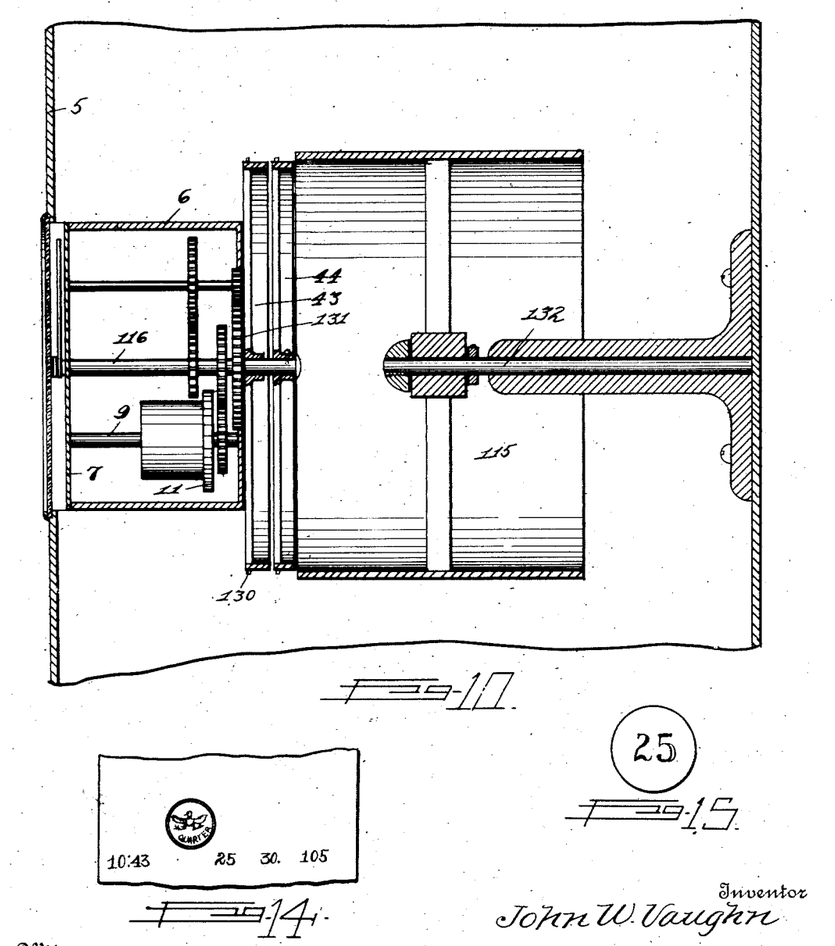
Fig. 10 is a detailed sectional view of the clock mechanism showing the method of actuating the minutes and hours tape wheels.
Fig. 14 is a detail view illustrating a portion of the printed web.
Fig. 15 is a view of one of the checks.

By referring to Fig. 10 it will be seen that the minutes wheel is mounted directly upon the main arbor of the clock, while the hours tape wheel is driven by gearing 131 from the spring that actuates the striking mechanism, said spring being mounted upon arbor 9. By referring to this figure it will likewise be seen that the paper web wheel has a mounting upon a stub-shaft 132 projecting from the rear wheel of the casing.

The operation of the device will now be described, and this operation may be more readily understood if the purposes for which the device is used are borne in mind. This device is adapted for use in many relations, such for instance, as keeping account of the wagon loads of dirt carried by street cleaning contractors and delivered at a dump. These contractors are ordinarily paid by the load, and this machine is adapted to record the number of loads delivered, the identity of the driver delivering them, the time of the delivery of each load, the amount paid for the hauling of such load if the hauling be immediately paid for, and the total amount paid out. Each driver has an identification check which is passed through the machine and is immediately returned to him. When the driver delivers a load at the dump, if the hauling is to be paid for immediately, the following operation takes place. The clerk or cashier in charge of the register places in chute 49 the identification check of the driver, and the coin to be used in paying for the hauling of that load. The coin and check fall to the position illustrated in dotted lines in Fig. 7. That is, they both lie in the same plane and do not overlap each other. They are retained in proper position by the coin and check receptacle 88. The clock mechanism will at this time have moved the proper hours and minutes figures upon the tapes between the printing plunger and the backing block, and if twenty-five cents is the denomination of the coin deposited, the clerk moves pointer 78 five spaces, or to the point designated twenty-five upon the scale 79. This shifts pin 60 (see Fig. 6) to such a position that the throw of arm 58 will move movable bar 66 the proper distance to move the total adder tape five spaces. The clerk next depresses handle 23. The depression of this handle accomplishes all of the following results. It shifts bar 52 to actuate the count tape 45, as hereinbefore described; it winds the strike and timing mechanism of the clock; it moves bar 66 the required distance to shift the total adder tape preparatory to moving the total adder tape upon return movement of handle 23; it forces the printing plunger forward, thereby binding the coin and check between the printing plunger and the backing block; and it retracts the coin and check receptacle 88 and leaves the coins unsupported for their engagement between the printing plunger and the backing block. The movement of arm 51 to shift bar 52 moves a pin 133 from over the tail end of a lever 134 to permit upward movement of said tail end and consequently downward movement of the forward end 135, said lever being pivoted at 136. The forward end of this lever 135 moves into engagement with a latch lug 137 of the backing block and holds the backing block against the tension of springs 42 and in its retracted position, consequently, when cams 28 pass cams 27, the spring 37 retracts the printing plunger, and the coin and check are left unsupported and they fall into and pass through a chute 138, from which they are returned to a cup 139 upon the exterior of a casing to permit of their delivery driver. It is not always desired to pay for the load at the time it is delivered, and yet it is desirable to record the delivery of the load and the time of its delivery, but it is apparent that in such cases means for preventing printing of the total adder tape must be provided. It is for this reason that the two chutes 48 and 49 are provided and under these latter circumstances the slide 50 is moved downward to cover the mouth of chute 49 and to uncover the mouth of chute 48, and the check is placed in the chute and travels to the position illustrated in dotted lines at 140 in Fig. 7. At this time this check lies in front of plunger 97 to prevent locking of the handle 23 by latch 101, but the edge of this check at this time sufficiently overlaps the total adder tape to prevent said total adder tape from being printed upon the paper web. It is to be understood that the identification checks will have raised identification characters upon them, and since ordinary coins have raised surfaces, it is apparent that the denomination of the coins used will be imprinted upon the paper tape intaglio.

While this register is particularly adapted for use in the above named relation, it is equally as well adapted for use in many other relations. Wherever a service is performed and it is desired to record the time of the performing of such service, or to identify the time of the performing of such service, or to record the amount paid for such service, or to register the total number of such services, or the total amount paid for such services, this machine may be used, and likewise it may be used to record the amount paid for merchandise as well as for services. It is therefore apparent that it has a wide range of usefulness, and that the elements shown are well adapted to serve the purposes for which they are intended.

It is to be understood that the invention is not limited to the precise construction set forth, but includes within its purview such changes as may be made within the scope of the appended claims.

Having described my invention, what I claim is:—

1. In a device of the character described, the combination with a printing plunger, of hours and minutes tapes, a timing mechanism for actuating said tapes, said hours and minutes tapes passing across the face of said plunger, of means for conducting a coin or check to position in front of said plunger, means for supporting said coin or check in front of said plunger, and a manually operable handle and means actuated by said handle for advancing said plunger and withdrawing said supporting means.

2. In a device of the character described, the combination with a printing plunger, of hours and minutes tapes, a timing mechanism for actuating said tapes, said hours and minutes tapes passing across the face of said plunger, of means for conducting a coin or check to position in front of said plunger, means for supporting said coin or check in front of said plunger, a manually operable handle, means actuated by said handle for advancing said plunger and withdrawing said supporting means, a backing block arranged in opposition to said plunger, and a web to be printed upon, passing between said plunger and said backing block.

3. In a device of the character described, the combination with a printing plunger, of hours and minutes tapes, a timing mechanism for actuating said tapes, said hours and minutes tapes passing across the face of said plunger, of means for conducting a coin or check to position in front of said plunger, means for supporting said coin or check in front of said plunger, a manually operable handle, means actuated by said handle for advancing said plunger and withdrawing said supporting means and means for conducting a web to be printed upon between said backing block and said plunger said web overlying said hours and minutes tapes.

4. In a device of the character described, the combination with a printing plunger, of hours and minutes tapes, a timing mechanism for actuating said tapes, said hours and minutes tapes passing across the face of said plunger, of means for conducting a coin or check to a position in front of said plunger, means for supporting said coin or check in front of said plunger, a manually operable handle, means actuated by said handle for advancing said plunger and withdrawing said supporting means, means for supporting a web to be printed upon said web passing between said backing block and said plunger and overlying said hours and minutes tapes, and a total adder tape passing between said plunger and said backing block, said web also overlying said total adder tape.

5. In a device of the character described, the combination with a printing plunger, of hours and minutes tapes, a timing mechanism for actuating said tapes, said hours and minutes tapes passing across the face of said plunger, of means for conducting a coin or check to a position in front of said plunger, means for supporting said coin or check in front of said plunger, a manually operable handle, means actuated by said handle for advancing said plunger and withdrawing said supporting means, means for supporting a web to be printed upon said web passing between said backing block and said plunger and overlying said hours and minutes tapes, a total adder tape passing between said plunger and said backing block, said web also overlying said total adder tape, and a count tape passing between said plunger and backing block and overlapped by said web.

6. In a device of the character described, the combination with a printing plunger, of hours and minutes tapes, a timing mechanism for actuating said tapes, said hours and minutes tapes passing across the face of said plunger, of means for conducting a coin or check to a position in front of said plunger, means for supporting said coin or check in front of said plunger, a manually operable handle, means actuated by said handle for advancing said plunger and withdrawing said supporting means, means for supporting a web to be printed upon said web passing between said backing block and said plunger and overlying said hours and minutes tapes, a total adder tape passing between said plunger and said backing block, said web also overlying said total adder tape, means for actuating said total adder tape comprising a slotted swinging arm actuated by said manually operable handle, a pin traveling in the slot of said arm, a yoke engaging with said pin, manually operable means for shifting said yoke to thereby vary the position of said pin in said slot and a pawl to which bodily movement is imparted from said swinging arm, said movement varying in accordance with the position of said pin in said slot.

7. In a device of the character described, the combination with a printing plunger, of hours and minutes tapes, a timing mechanism for actuating said tapes, said hours and minutes tapes passing across the face of said plunger, of means for conducting a coin or check to a position in front of said plunger, means for supporting said coin or check in front of said plunger, a manually operable handle, means actuated by said handle for advancing said plunger and withdrawing said supporting means, a web to be printed upon said web passing between said backing block and said plunger and overlying said hours and minutes tapes, a total adder tape passing between said plunger and said backing block, said web also overlying said total adder tape, means for variably shifting said total adder tape comprising a rotative shaft, a segment mounted thereon, a rack bar with which said segment meshes, a yoke fixed to said segment, a slotted arm actuated by the manually operable handle, a pin passing through said slotted arm and through said yoke, a longitudinally slidable bar having a slotted extension through which said pin passes, a pawl pivoted to said bar and teeth formed upon said total adder tape with which said pawl engages.

8. In a device of the character described, the combination with a clock mechanism comprising a striking mechanism and a timing mechanism, of an hours tape driven from the striking mechanism, a minutes tape driven from the timing mechanism, a printing plunger in front of which said tapes pass, a backing block opposed to said printing plunger, a longitudinally shiftable bar, cams carried by said bar, cams carried by the printing plunger for engagement by said cams of the bar to force said plunger toward said backing block, spring means for retracting said plunger, a manually operable main shaft, connections between said shaft and said longitudinally shiftable bar, a coin or check receiving and supporting member having a cam slot formed therein, a member carried by said shaft for engagement with said cam slot to retract the coin receiving and supporting member, and means for latching the backing block in its retracted position when said shaft is actuated in one direction.

9. In a device of the character described, the combination with a clock mechanism comprising a striking mechanism and a timing mechanism, of an hours tape driven from the striking mechanism, a minutes tape driven from the timing mechanism, a printing plunger in front of which said tapes pass, a backing block opposed to said printing plunger, a longitudinally shiftable bar, cams carried by said bar, cams carried by the printing plunger for engagement by said cams of the bar to force said plunger toward said backing block, spring means for retracting said plunger, a manually operable main shaft, connections between said shaft and said longitudinally shiftable bar, a coin or check receiving and supporting member having a cam slot formed therein, a member carried by said shaft for engagement with said slot to retract the coin receiving and supporting member, means for latching the backing block in its retracted position when said shaft is actuated in one direction, and means for releasing said latch when the handle is returned to normal position.

10. In a device of the character described, the combination with a main actuating shaft, of a printing plunger, a backing block, means for conducting a check or coin to a position in front of said plunger, means for preventing actuation of said shaft, except when a coin or check is in position, said means comprising a plunger passing through said printing plunger, a member to which said plunger is connected, said member having a latch head formed thereon, a spring actuated plunger carried by the latch head and a member carried by said shaft and passing through said latch head.

11. In a device of the character described, the combination with a printing plunger, a backing block, of a main actuating shaft, means for actuating said printing plunger from said shaft, means for conducting a check or coin to a position in front of said plunger, and means for preventing movement of the main actuating shaft, except when a coin or check is in position.

12. In a device of the character described, the combination with a printing plunger, a backing block, of a main actuating shaft, means for actuating said printing plunger from said shaft, means for conducting a check or coin to a position in front of said plunger, means for preventing movement of the main actuating shaft, except when a coin or check is in position, said means comprising a plunger passing through said printing plunger, a pivoted bar to which said plunger is pivotally connected, an L-shaped head upon said bar, a latch member in which said L-shaped head terminates, a spring actuated member opposed to said latch head, and an extending arm formed upon said shaft and passing downwardly through said latch head and adapted to pass outwardly between said spring actuated plunger and said latch member.

13. In a device of the character described, the combination with a printing plunger, a backing block, of housings having slots formed therein in which extensions of the printing plunger travel, pins carried by said extensions and passing through said slots, and a flat spring member engaging said pins to retract said printing plunger.

14. In a device of the character described, the combination with a printing plunger, a backing block, of housings having slots formed therein in which extensions of the printing plunger travel, pins carried by said extensions and passing through said slots, a flat spring member engaging said pins to retract said printing plunger, cams formed upon the rear face of the printing plunger, a longitudinally shiftable bar, cams formed upon said bar for engagement with the cams, of the plunger, a main operating shaft and means for actuating said bar from said operating shaft.

15. In a device of the character described, the combination with a printing plunger, a backing block, of housings having slots formed therein in which extensions of the printing plunger travel, pins carried by said extensions and passing through said slots, a flat spring member engaging said pins to retract said printing plunger, cams formed upon the rear face of the printing plunger, a longitudinally shiftable bar, cams formed upon said bar for engagement with the cams of the plunger, a main operating shaft, means for actuating said bar from said operating shaft, a cup-like coin receiving and supporting member traveling in a cut out portion of said printing plunger, a rearward extension carried thereby, a cam slot formed in said rearward extension, guides for said rearward extension and a member adapted for engagement with the cam slot to retract the coin receiving and supporting member.

16. In a device of the character described, the combination with a printing plunger, a backing block, of housings having slots formed therein in which extensions of the printing plunger travel, pins carried by said extensions and passing through said slots, a flat spring member engaging said pins to retract said printing plunger, cams formed upon the rear face of the printing plunger, a longitudinally shiftable bar, cams formed upon said bar for engagement with the cams of the plunger, a main operating shaft, means for actuating said bar from said operating shaft, a cup-like coin receiving and supporting member traveling in a cut out portion of said printing plunger, a rearward extension carried thereby, a cam slot formed in said rearward extension, guides for said rearward extension, a member adapted for engagement with the cam slot to retract the coin receiving and supporting member, a chute for conducting coins to a position between the printing plunger and the backing block, and a chute located between the printing plunger and the backing block for conducting coins to the exterior of the machines.

17. In a device of the character described, the combination with a count tape, of means for imparting a step by step movement to said count tape comprising a longitudinally slidable bar; a pawl pivoted to said bar and engaging teeth formed upon the edge of the count tape, a main operating handle and means for imparting movement to said bar from said handle.

18. In a device of the character described, the combination with a count tape, of means for imparting a step by step movement to said count tape comprising a longitudinally slidable bar, a pawl pivoted to said bar and engaging teeth formed upon the edge of the count tape, a main operating handle, means for imparting movement to said bar from said handle, said means comprising a crank arm formed upon said handle, and a pin extending from said bar which enters a slot formed in said crank arm.

19. In a device of the character described, the combination with a printing plunger, a backing block, of housings having slots formed therein in which extensions of the printing plunger travel, pins carried by said extensions and passing through said slots, a flat spring member engaging said pins to retract said printing plunger, cams formed upon the rear face of the printing plunger, a longitudinally shiftable bar, cams formed upon said bar for engagement with the cams of the plunger, a main operating shaft, means for actuating said bar from said operating shaft, a cup-like coin receiving and supporting member traveling in a cut out portion of said printing plunger, a rearward extension carried thereby, a cam slot formed in said rearward extension, guides for said rearward extension, a member adapted for engagement with the cam slot to retract the coin receiving and supporting member, a chute for conducting coins to a position between the printing plunger and the backing block, a chute located between the printing plunger and the backing block for conducting coins to the exterior of the machine and a cup located at the exterior of the machine into which the last named coin chute discharges.

20. In a device of the character described, the combination with a printing plunger and backing block, of means for supporting a paper web to be printed on in position to pass therebetween, an hours and minutes tape passing between said printing plunger and backing block and overlapped by said web, a total adder tape and a count tape passing between the printing plunger and the backing block and overlapped by said web, a coin receiving and supporting member traveling in a cut out portion of the printing plunger and arranged to support either a check or coin or both between the printing plunger and backing block and also arranged to support a check between the printing plunger and backing block in such position as to overlap and prevent the printing of the total adder tape.

21. In a device of the character described, the combination with a printing plunger, and backing block, of means for supporting a paper web to be printed on in position to pass therebetween, an hours and minutes tape passing between said printing plunger and backing block and overlapped by said web, a total adder tape and a count tape passing between the printing plunger and backing block, and overlapped by said web, a coin receiving and supporting member traveling in a cut out portion of the printing plunger and arranged to support either a check or coin or both between the printing plunger and backing block and also arranged to support a check between the printing plunger and backing block in such position as to overlap and prevent the printing of the total adder tape, and a pair of coin chutes, one of which conducts a check or coin to a position to be printed without interfering with the total adder tape and the other of which conducts a check to a position to be printed and to prevent the printing of the total adder tape.

22. In a device of the character described, the combination with a printing plunger and backing block, of means for supporting a paper web to be printed on in position to pass therebetween, an hours and minutes tape passing between said printing plunger and backing block and overlapped by said web, a total adder tape and a count tape passing between the printing plunger and backing block, and overlapped by said web, a coin receiving and supporting member traveling in a cut out portion of the printing plunger and arranged to support either a check or coin or both between the printing plunger and backing block and also arranged to support a check between the printing plunger and backing block in such position as to overlap and prevent the printing of the total adder tape; a pair of coin chutes, one of which conducts a check or coin to a position to be printed without interfering with the total adder tape, and the other of which conducts a check to position to be printed and to prevent printing of the total adder tape and a coin chute adapted to receive the checks or coins from either position and conduct them to the exterior of the machine.

23. In a device of the character described, the combination with a printing plunger and backing block, of means for supporting a paper web to be printed on in position to pass therebetween, an hours and minutes tape passing between said printing plunger and backing block and overlapped by said web, a total adder tape and a count tape passing between the printing plunger and backing block, and overlapped by said web, a coin receiving and supporting member traveling in a cut out portion of the printing plunger and arranged to support either a check or coin or both between the printing plunger and backing block and also arranged to support a check between the printing plunger and backing block in such position as to overlap and prevent the printing of the total adder tape, a pair of coin chutes, one of which conducts a check or coin to a position to be printed without interfering with the total adder tape, and the other of which conducts a check to position to be printed and to prevent printing of the total adder tape, a coin chute adapted to receive the checks or coins from either position and conduct them to the exterior of the machine, and a cup located at the exterior of the machine into which the last named chute discharges.

24. In a device of the character described, the combination with a printing plunger, and backing block, of means for supporting a paper web to be printed on in position to pass therebetween, an hours and minutes tape passing between said printing plunger and backing block and overlapped by said web, a total adder tape and a count tape passing between the printing plunger and backing block and overlapped by said web, a coin receiving and supporting member traveling in a cut out portion of the printing plunger and arranged to support either a check or coin or both between the printing plunger and backing block and also arranged to support a check between the printing plunger and backing block in such position as to overlap and prevent the printing of the total adder tape, and a pair of coin chutes, one of which conducts a check or coin to a position to be printed without interfering with the total adder tape and the other of which conducts a check to the position to be printed and to prevent the printing of the total adder tape and a slide arranged at the mouths of said chutes and adapted to close the mouth of either of said chutes.

25. In a device of the character described, the combination with a casing, of a clock mechanism mounted therein and comprising a dial visible at the front of said casing and hands traveling over said dial to indicate the hours and minutes of the day, hours and minutes steel tapes, means for driving said hours and minutes tapes in unison with the clock mechanism from the clock mechanism, a printing plunger and backing block opposed to said plunger between which said hours and minutes tapes pass, means for supporting a paper web pass between the printing plunger and the backing block and over-lap the hours and minutes tapes, rolls mounted in said casing, said paper web being wound from one of said rolls and upon the other of said rolls, a main operating shaft and means for actuating the winding roll of the paper web when said shaft is moved.

In testimony whereof I affix my signature in presence of two witnesses.

JOHN W. VAUGHN.

Witnesses:
CHARLES J. SHUTE,
ALFRED P. HANKS.